(12) United States Patent
Nanda et al.

(10) Patent No.: US 8,645,284 B2
(45) Date of Patent: Feb. 4, 2014

(54) METHODS AND SYSTEMS FOR COMPUTERIZED EMPLOYMENT RECRUITING

(75) Inventors: Vishnu Nanda, Bangalore (IN); Anup P. Mutalik, Bangalore (IN); Kashinath Kakarla, Bangalore (IN); Sagar Dutta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 203 days.

(21) Appl. No.: 13/032,243

(22) Filed: Feb. 22, 2011

(65) Prior Publication Data

US 2012/0215709 A1 Aug. 23, 2012

(51) Int. Cl.
*G06Q 10/10* (2012.01)
*G06Q 10/06* (2012.01)
*G06Q 30/08* (2012.01)
*G06Q 10/00* (2012.01)
*G06Q 30/02* (2012.01)

(52) U.S. Cl.
USPC .......................................... 705/321; 705/1.1

(58) Field of Classification Search
None
See application file for complete search history.

(56) References Cited

U.S. PATENT DOCUMENTS

| | | | |
|---|---|---|---|
| 6,289,340 B1 | 9/2001 | Puram et al. | |
| 6,385,620 B1 | 5/2002 | Kurzius et al. | |
| 2006/0265268 A1 | 11/2006 | Hyder et al. | |
| 2007/0078849 A1* | 4/2007 | Slothouber | 707/5 |
| 2008/0016054 A1 | 1/2008 | Liska | |
| 2009/0005040 A1* | 1/2009 | Bourne | 455/435.1 |
| 2012/0109837 A1* | 5/2012 | Sahagun et al. | 705/321 |

OTHER PUBLICATIONS

PCT International Search Report for PCT/US2011/026352, Applicant: Intuit Inc., Form PCT/ISA/210 and 220, dated Mar. 2, 2012 (5 pages).
PCT Written Opinion of the International Search Authority for PCT/US2011/026352, Applicant: Intuit Inc., Form PCT/ISA/237, dated Mar. 2, 2012 (4 pages).

* cited by examiner

*Primary Examiner* — Jonathan Ouellette
(74) *Attorney, Agent, or Firm* — Vista IP Law Group LLP (57) ABSTRACT

Methods, systems and articles of manufacture for computerized employment recruiting are provided. The system accesses a candidate database of candidate data for a plurality of candidates and a job posting database. The system compares the qualifications of the candidates to the job criteria for the job postings and determines a match between the qualifications and the job criteria. The system also identifies a inferred links between the candidates and the employer for the job postings to provide an added reliability factor to the referred candidates. The system ranks the matched candidates based, at least in part, using the inferred links and provides the ranked candidates to the employer. The system may use ontology based, and semantic matching based, algorithms for matching candidates to job postings, and also for identifying inferred links between candidates and employers.

21 Claims, 2 Drawing Sheets

METHODS AND SYSTEMS FOR COMPUTERIZED EMPLOYMENT RECRUITING

BACKGROUND

The invention relates to employment recruiting; and more particularly, to new computerized systems and methods for identifying and providing the most appropriate employment candidates to an employer for a job posting.

Computer accessible employment posting and search systems have now existed for many years. While most of such systems are internet website based, some proprietary networks still exist within some employment agencies and placement services (such as a school's career counseling or placement office). Examples of several internet based employment systems include MONSTER.COM, CAREERBUILDER.COM and JOBS.COM.

The most basic employment systems simply include a database of job postings from employers seeking employment candidates. The job postings may include, for example, information regarding the employer for the job posting, the type of job, job criteria, job qualifications, and job location, and employer information such as employer name, address, and contact information. The database is then searchable by a job searcher, i.e. persons looking for a job or by an employment agent or placement service trying to place a candidate with a job. Depending on the complexity of the system, the job postings may be searched by keywords, job classifications, job location, salary range, or other search criteria. If the job searcher finds a job of interest, the system may also allow the job searcher to submit a resume, or otherwise apply for the job, with the employer.

On the employee side of the equation, some employment systems include a database of prospective candidates with candidate data for each candidate. The candidate data may include, for example, the candidate's name and personal information such as address, phone number, and contact information, education, employment history, including information regarding previous employers, job qualifications, career goals, desired job criteria, and even a resume. Employers and employment agents working on behalf of employers can search the candidate database for desirable candidates meeting the needs of the employers. Similar to searching the job posting database, the system may allow searching for qualified and desirable candidates by keyword(s) and other defined criteria, such as qualifications, education, salary range, location, willingness to relocate, etc.

The internet based employment systems mentioned above, such as MONSTER.COM and CAREERBUILDER.COM, include both an employer job posting database and a candidate database. Hence, these systems allow a job searcher to search job postings over the internet, and to respond to a desired job posting by electronically submitting a resume and/or application to the employer for the job posting. The systems also allow employers seeking job candidates to search the candidate database and to contact desirable candidates, such as by sending an email advising of the employer's interest, or by using the candidates' contact information listed in the candidates' profiles in the candidate database.

However, current employment systems, such as those mentioned above, frequently result in a large number of responses to job postings, as there is no screening of the candidates prior to a candidates' submission of a resume or application to the employer for the job posting. As a result, an employer may be inundated with numerous resumes and applications from less than qualified, or less than desirable, candidates. The employer must sift through the applications to find the most desirable candidates to follow-up in the hiring process. Similarly, keyword searches of candidate databases by employers often result in a large number of hits, with most of the hits being less than desirable. The systems do not have an effective process for identifying the most reliable and desirable candidates, or for providing these candidates to the employers.

From the perspective of the job searcher, the keyword searches may not identify all of the available job postings for which they may be interested and/or qualified, or the searches may provide too many results including many that are unsuitable or undesirable. Moreover, candidates may not have time to frequently search the job postings in a database because they are working another job or going to school. The job searcher may not have access to the internet or the employment system.

Moreover, in the hiring process, beyond finding a candidate with skills that match the job qualifications, personal references can be an important and critical aspect in improving the chances of finding the right candidate for a job. It is commonly known that the best job candidates tend to be referrals from people known to the employer that can provide a recommendation for the candidate. A referral can provide information regarding a candidate that cannot be conveyed in a resume, application, or other candidate data. In addition, a referral can validate the candidate data available from the recruiting system, making the candidate data, and the candidate, more reliable. Accordingly, employers often first look to their network of friends, family and business associates to find and interview potential employees. A referral from a known person adds to the reliability of a candidate, making the candidate more likely to be hired. This is especially true for small businesses, where the business owner may be making the hiring decision. However, an employer's available referrals are limited and can be quickly exhausted without finding enough candidates. Currently available employment recruiting systems do not provide a feature for improving the reliability of candidates similar to a referral.

Accordingly, there is a need for an improved employment recruiting system which overcomes some of the deficiencies of prior systems.

SUMMARY

The present invention is directed to a system, method and article of manufacture for a computerized employment recruiting system which matches candidates to job postings, identifies reliability factors relating to candidates such as personal references or other indicators of reliability, and provides a ranking of candidates to help an employer find the most desirable candidates for a given job posting. Thus, rather than requiring employers to search through long lists of apparently "qualified" candidates, or requiring employees to search through numerous job postings, the system of the present invention matches, validates and ranks candidates for a given job posting. A list of the top ranked candidates is provided to the employer so that the employer can review a more manageable number of candidate search results. If the employer wants to review more candidates, the system can then provide a list of the next highest ranked candidates, and so on, until the employer has hired a candidate, or the list of ranked candidates is exhausted.

Accordingly, one embodiment of the present invention is directed to method for computerized employment recruiting. The method comprises a step of storing and/or accessing, by a computerized employment recruiting system, a candidate database of candidate data for a plurality of candidates, including a first candidate. The candidate data for each candidate includes candidate qualifications and candidate personal information. The computerized employment recruiting system typically comprises one or more computers, servers, and storage devices programmed and configured to implement the method, as described in more detail below.

The employment recruiting system also stores and/or accesses a job posting database of job posting data for a plurality of job postings. The job posting data for each job posting includes employer information and job criteria. The job posting database and the candidate database may be integrated into a single, integrated database or they may be separate databases.

The system compares the qualifications of the first candidate and the job criteria for the job postings and determines a match between the qualifications of the first candidate and the job criteria for a first job posting within the plurality of job postings. As used herein, the term "match" or "matches," with respect to the step of matching the candidate qualifications to the job criteria, means that a least a portion of the qualifications matches at least a portion of the job criteria, to a minimum degree. The minimum degree may vary for different job searches, depending on various factors which may be chosen by the system, by the employer and/or by the candidate, but generally indicates that the candidate is determined to have the minimum qualifications necessary to make the candidate of interest to the employer for the respective job posting.

The system also identifies a "softlink" between the first candidate and the employer for the first job posting. As used herein, the term "softlink" means an inferred connection between a candidate and the employer for a job posting tending to make the candidate a better candidate for a job posting for an employer, wherein the connection is based upon:

a. proximity data, including, (i) the proximity of the candidate's residence to the location of the job or the employer for the job posting, (ii) the proximity of a previous employer of the candidate and the location of the job or the employer for the job posting, or (iii) proximity of a personal reference of the candidate and the employer for the job posting; or b. identification of a potential personal reference for said candidate by linking personal reference data of the personal reference and the candidate data, and/or linking personal reference data of the personal reference and employer data regarding the employer.

It may be easier to understand a softlink by comparing it to a "hardlink," and by giving a few examples. A softlink is distinguishable from a hardlink because a hardlink is an express connection between the candidate and the job posting. For example, if the candidate lists as a reference in his/her candidate data an employee of the employer for the job posting, then there is a hardlink between the candidate and the job posting because there exists a direct connection between the candidate and the job posting, no assumptions need be made to make a connection between them. On the other hand, a softlink would be inferred if the candidate graduated from the same college in the same year as an employee of the employer for the job posting. The system can analyze the information using a matching algorithm to determine a softlink between the candidate and the job posting based on assumption that there is a reasonable likelihood that the employee of the employer may know the candidate, such that the employee is a potential personal reference for the for the candidate that is known to the employer. In other words, the current employee has a potential link to the candidate and a link to the employer, such that the system can infer a softlink between the candidate and the employer.

As an example of a proximity based softlink, the system may determine that the candidate's residential address is within a certain proximity, such as within 500 meters, to the address of the job or the employer. The system will identify this as a softlink because it is often desirable to have an employee that lives close to the job location, and the employer may be able to find personal references for the candidate within the neighborhood.

The system then assigns a softlink relevance index to the identified softlink. As used herein, the term "softlink relevance index" means a factor related to a predicted level of relevance of a softlink to a hiring decision by the employer for the job posting. Some types of softlinks will be more relevant, or more important, to a hiring decision, and therefore will have a higher relevance index, while other types of softlinks may be less relevant, or less important, to a hiring decision, and will have a lower relevance index. For example, a proximity softlink based on the proximity of the candidate's residence to the job location may be more likely to improve a candidate's desirability to an employer than a softlink based on a chance that a potential personal reference will turn out to be an actual reference. The system may use feedback of historical employer contacts with candidates and employer hiring decisions to adjust the way the system assigns a softlink relevance index to a softlink.

Next, the employment recruiting system ranks the first candidate among a plurality of candidates for the first job posting based, at least in part, upon the softlink relevance index. The system will typically match more than one candidate within the candidate database for the first job posting. Therefore, the system ranks the candidates, including the first candidate, in order of suitability and reliability for the job posting. The ranking may take also take into account other factors in addition to the softlink relevance index, such as qualifications, salary, career goals, location, personal references, education, etc.

The system then transmits a list of a specified number of the top ranked candidates (i.e. most desirable candidates) for the first job posting to the employer (or other contact specified by the poster of the job posting, such as a recruiter or employment agency). For example, the system may transmit the top five ranked candidates, or a number of candidates specified by the job poster. If the employer wants to see more candidates for some reason (e.g. the employer wants to interview more candidates, or the employer did not find a desirable hire), then the system can transmit a list of the next highest ranked candidates, and so on, upon the request of the employer.

In another aspect of the present invention, the system will utilize a candidate comparing and matching algorithm to perform the steps of comparing and matching the candidate qualification to the job criteria wherein the algorithm uses an ontology driven approach to organizing the qualifications and job criteria within the databases. This will capture the skill classification and create a knowledge base of skills across verticals. The term "ontology" means an organization of the qualification data and job criteria data that is hierarchical and comprehensive of all the data. Moreover, the algorithm uses the ontology based database to perform a semantic match of candidate qualification, job criteria and skill relevancy. Semantic matching means that the matching compares the meaning of words and terms, and not just the terms themselves.

In still another aspect of the present invention, the system provides for communication between the system and candidates and employers through one or more cellular phone networks. In this way, the system can communicate with a cellular phone or other cellular communication device of candidates and employers, using short message service ("SMS"), media message service ("MMS"), a custom application ("app") executing on the mobile device, or other suitable protocol. This allows the system to be utilized by a candidate or employee without an internet or private network connection to the system, or even without a computer. The system can also be configured to enable communication between a cellular device of a candidate and a cellular device of an employer, without allowing either party to have direct access to the other party.

Another embodiment of the present invention is directed to a system for performing computerized employment recruiting configured to implement the method described above. The system comprises an employment recruiting system having one or more computers, servers, and storage devices. The computers are programmed to implement the employment recruiting methods of the present invention. The storage devices store the candidate database and job posting database.

The employment recruiting system is operably coupled to a communication network to provide communication with a communication device of a candidate or employer, such as an internet connected computer, or a cellular communication device such as a mobile phone or smart phone. The system may also comprise a website server hosting a website configured to interface between the employment recruiting system and the candidates and employers. The website may be connected to the employment recruiting system through a communication network, or it may even be integrated with the employment recruiting system.

The communication networks of the system may include a proprietary network, LAN, WAN, cellular network, wireless network, wired telephone network, the internet and/or other suitable network. The system and/or the communication network may also include a mobile application interface configured to receive application data from a mobile device such as a mobile phone or other cellular network connected device, such as a cellular mobile phone, PDA, smart phone or other portable cellular device. The mobile application interface may communicate with a mobile device using SMS, MMS, an app executing on the mobile device, or other suitable protocol.

The system for employment recruiting is configured to perform the following steps: (a) accessing a candidate database of candidate data for a plurality of candidates, including a first candidate, the candidate data of each candidate including candidate qualification and candidate personal information; (b) accessing a job posting database of job posting data for a plurality of job postings, the job posting data for each job posting including employer information and job criteria; (c) comparing the qualifications of the first candidate to the job criteria for a plurality of the job postings; (d) determining a match between the qualifications of the first candidate and the job criteria for a first job posting within the plurality of job postings; (e) identifying a softlink between the first candidate and the employer for the first job posting; (f) determining a softlink relevance index for the identified softlink; and (g) generating a ranking of the first candidate among a plurality of candidates for the first job posting based, at least in part, upon the softlink relevance index.

Another embodiment of the present invention is directed to an article of manufacture comprising a computer program carrier readable by a computer and embodying instructions executable by the computer to program a computer system to perform the steps of at least one of the method embodiments of the present invention, including, for example: (a) accessing a candidate database of candidate data for a plurality of candidates, including a first candidate, the candidate data of each candidate including candidate qualification and candidate personal information; (b) accessing a job posting database of job posting data for a plurality of job postings, the job posting data for each job posting including employer information and job criteria; (c) comparing the qualifications of the first candidate to the job criteria for a plurality of the job postings; (d) determining a match between the qualifications of the first candidate and the job criteria for a first job posting within the plurality of job postings; (e) identifying a softlink between the first candidate and the employer for the first job posting; (f) determining a softlink relevance index for the identified softlink; and (g) generating a ranking of the first candidate among a plurality of candidates for the first job posting based, at least in part, upon the softlink relevance index.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION OF ILLUSTRATED EMBODIMENTS

Embodiments of the present invention are directed to systems, methods and articles for implementing computerized employment recruiting which can match candidates to job postings, can identify softlinks to improve the reliability and suitability of candidates matched to a job posting, and can rank matched candidates in order of their suitability and reliability for the job posting. Thus, the invention not only streamlines the employment recruiting process for employers and candidates, but also provides better matched candidates sorted from higher ranked candidate to lower ranked candidate. This allows an employer to find the right candidate for the right job faster and more efficiently. It also helps candidates find the right job faster and easier.

Figure 1:
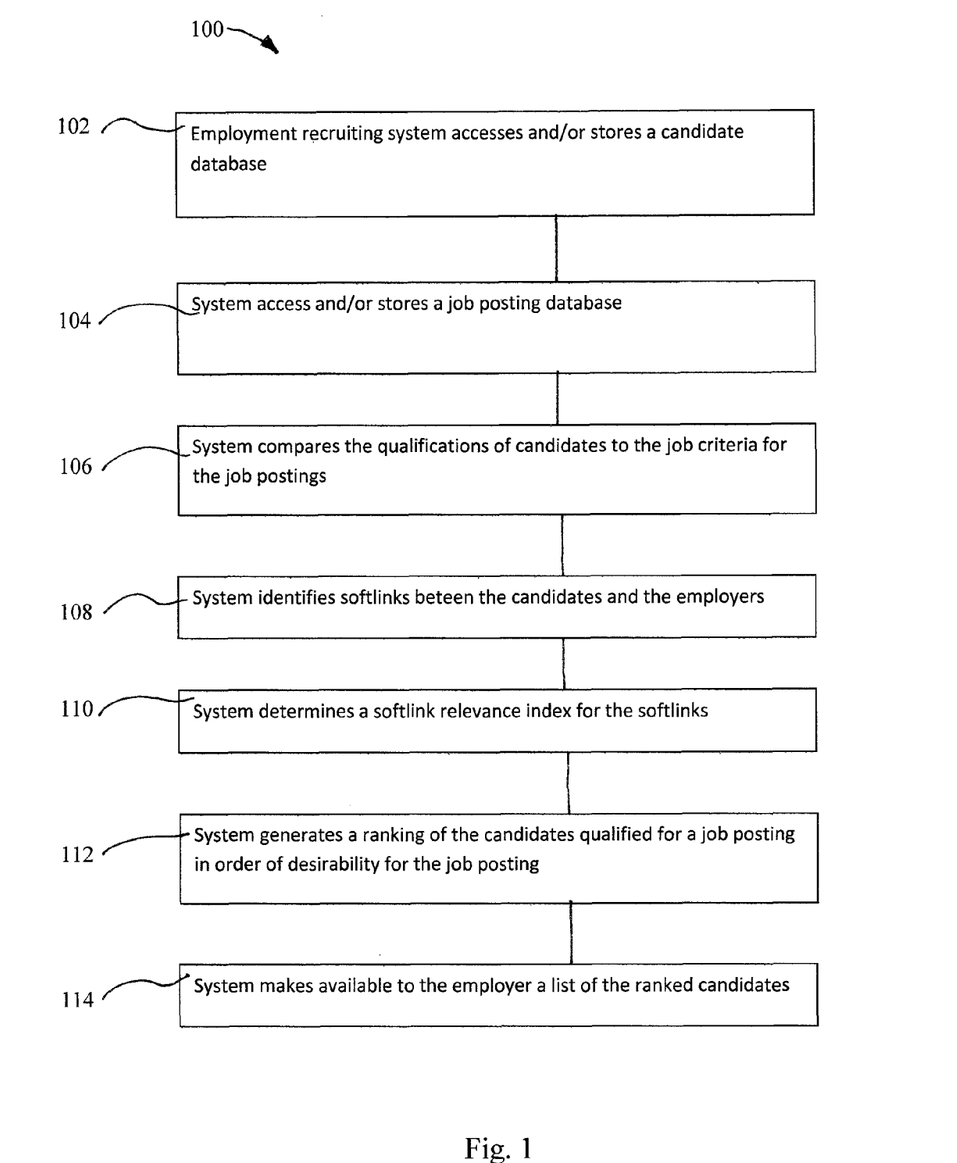
FIG. 1 is a flow chart of a method for computerized employment recruiting according to one embodiment of the present invention.

Referring to FIG. 1, in one embodiment of the present invention, a method 100 for computerized employment recruiting is shown. The method 100 will typically be implemented within a system having a computerized employment recruiting system, such as the system 200 described in more detail below. The method 100 comprises a step 102, in which the computerized employment recruiting system stores and/or accesses a candidate database of candidate data for a plurality of candidates. The candidate data for each candidate includes candidate personal data, such as residence address, mailing address, phone number, other contact information like email address. The candidate data also includes candidate qualifications, such as education, work experience, employment history, salary history, and the like. The candidate data may also include data regarding the candidate's desired job or career, such as salary range, location, willingness to relocate, target employers, etc. As stated above, the system can store the candidate database, or could simply access a third party candidate database. For example, the operator of the system could license a candidate database from a third party.

The method 100 may also include the steps for building the candidate database, such as receiving and storing candidate data from a plurality of candidates, the candidate data including candidate personal information and candidate qualifications. The candidates can transmit the candidate data to the system by any suitable means. For example, the candidate can fill out a candidate profile through a website of the system in which the candidate fill out an online form on an internet connected device and the candidate data is transmitted through the internet to the employment recruiting system. In this case, the data entry device is a computer, such as a personal computer. The candidate data may be received from a candidate over a voice phone call to a service provider representative who enters the candidate data into a computer networked to the employment recruiting system. The candidate data may also be submitted by a candidate using a cellular phone as the data entry device, such as a mobile phone or smart phone. The candidate may enter the data using SMS messaging, MMS messaging, or an application program running on the mobile phone. In this way, a candidate can access the employment recruiting system from virtually anywhere. For instance, the candidate may initiate the sign-up process by sending an SMS message, such as the word "signup", to a special phone number set up by the employment recruiting system provider, and operated by a mobile application system of the provider. Then, the mobile application system sends SMS messages to the candidate's mobile phone in a series of information requests to which the candidate can respond with the responsive candidate data. The mobile application system stores the candidate's responses as an electronic candidate profile. Then, the mobile application system transmits the candidate data to the employment recruiting system. The mobile application system can be integrated with the employment recruiting system, or it can be a separate system.

At step 104, the computerized employment recruiting system stores and/or accesses a job posting database of job posting data for a plurality of job postings. The job posting data for each job posting includes employer information, such as employer name, employer address, and contact information like phone number, email address and contact person. The job posting data also includes job criteria such as the type of job, job qualifications such as education and work experience, job responsibilities, job location (which may differ from the employer address), and the like. The job posting data may also include data regarding the job's salary range, relocation package, or other factors related to the desired candidate. Similar to the candidate database, the job posting database can be stored in the system or it can be a third party job posting database accessed by the system.

Also, similar to the candidate database, the method 100 may also includes the steps for building the job posting database, including receiving and storing job posting data from job posters (such as employers, employment agencies, and the like) for a plurality of job postings, wherein the job posting data includes employer information and job criteria. The job posters can transmit, and the system can receive and store, the job posting data by any of the means described above for the candidate data. For one, a job poster can fill out a job posting through a website of the system in which the job poster fills out a form on an internet connected device and the job posting data is transmitted through the internet to the employment recruiting system. Job posting data for a job posting may also be received from a job poster via a voice phone call to a service provider representative who enters the job posting data into a computer networked to the employment recruiting system. The job posting data may also be submitted by a job poster using a cellular phone communication device, such as a mobile phone or smart phone. The job poster may enter the data using SMS messaging, MMS messaging, or an application program running on the mobile phone. As an example, the job poster may initiate the job posting process by sending an SMS message, such as the term "job posting", to a special phone number set up by the employment recruiting system provider, and operated by a mobile application system of the provider. Then, the mobile application system sends SMS messages to the job poster's mobile phone in a series of information requests to which the job poster can respond with the responsive job posting data. The mobile application system stores the job poster's responses as an electronic candidate profile. Then, the mobile application system transmits the job posting data to the employment recruiting system.

At step 106, the employment recruiting system compares the qualifications of candidates to the job criteria for the job postings and determines one or more matches between the qualifications of the candidates and the job criteria. The method utilizes a candidate recommendation engine to compare and match the qualifications of the candidates to the job criteria for the job postings. The candidate recommendation engine includes a comparing and matching algorithm to compare and match candidate qualifications to the job criteria for the job postings.

In another aspect of step 106, the comparing and matching algorithm uses an ontology driven approach to organizing the qualifications and job criteria within the candidate data and job posting data databases. Within any profession or job classification, there are specializations and sub-classifications. The ontology based organization captures the skill classifications and creates a knowledge base of skills across vertical levels of job specializations within job classifications. In addition, the comparing and matching algorithm uses the ontology based organization of the database to perform a semantic match of candidate qualifications, job criteria and skill relevancy, by comparing and matching the meaning of keywords and concepts within the candidate qualifications and job criteria.

At step 108, the system identifies "softlinks" between the candidates and the employers for the respective job postings. The softlinks are additional references and attributes of the candidates which are not directly related to the qualifications of the candidates, such as skill level and proficiency of the candidates, but which provide some inferred connection between a candidates and an employer tending to give a higher degree of confidence to the employer to hire the candidate. A softlink can provide an employer a higher confidence level on the reliability aspect of a candidate, similar to sourcing a candidate from the trusted network connections of the employer.

The term "softlink" is defined above, but the definition is repeated here for convenience. As used herein, the term "softlink" means an inferred connection between a candidate and the employer for a job posting tending to make the candidate a better candidate for a job posting for an employer, wherein the connection is based upon:

a. proximity data, including, (i) the proximity of the candidate's residence to the location of the job or the employer for the job posting, (ii) the proximity of a previous employer of the candidate and the location of the job or the employer for the job posting, or (iii) proximity of a personal reference of the candidate and the employer for the job posting; or b. identification of a potential personal reference for said candidate by linking personal reference data of the personal reference and the candidate data, and/or linking personal reference data of the personal reference and employer data regarding the employer.

Several non-limiting examples of different softlinks the system may generate at step 108 are described below:

1. Softlink Based on Proximity of Candidate's Residence to Job Location

The system uses geographic coordinates of the address of the employer or job location and the candidate's residence location to determine the proximity of the two locations. If the distance between the candidate's residence and the employer or job location is within a certain proximity, the system will determine this factor as a softlink. The system may also utilize an application programming interface (API), such as Google maps, to determine the travel distance and/or travel time between the two locations. Then, if the travel distance or travel time is within a certain range, the system will determine this factor as a softlink. As an example, if the system determines a candidate should be referred in response to a job posting, the system may send an SMS to the employer for the job posting, as follows:

9742282145, John Pavan, 3 yrs, marketing, Jayanagar
Candidate residence is 2 blocks away from your office The close proximity of the candidate is potentially of great interest to the employer because the candidate can get to work quickly and easily, or even when not scheduled to work. The close proximity may also allow the employer to investigate the candidate from neighborhood contacts.

2. Softlink Based on Proximity of Candidate's Previous Employer to Job Location

The system uses geographic coordinates of the address of the employer or job location and the address of a candidate's previous employment to determine the proximity of the two locations. If the distance between the employer or job location and the candidate's previous employment is within a certain proximity, the system will determine this factor as a softlink. Again, the system may also utilize an application programming interface (API), such as Google maps, to determine the travel distance and/or travel time between the two locations. Then, if the travel distance or travel time is within a certain range, the system will determine this factor as a softlink. As an example, if the system determines a candidate should be referred in response to a job posting, the system may send an SMS to the employer for the job posting, as follows:

9742282145, John Pavan, 3 yrs, marketing, Jayanagar
Candidate previous employer Kiran Enterprises is on the same street as your workplace.

The close proximity of the candidate's previous employer is useful to the prospective employer for the job posting because the employer may know the previous employer, or can easily make a personal visit to the previous employer to obtain a personal reference regarding the candidate.

3. Softlink Based on Proximity of a Personal Reference of the Candidate and the Employer for the Job Posting The system supports the ability for a candidate to input their network of connections and references, including their addresses. The system uses geographic coordinates of the address of a candidate's reference and the address of the employer for the job posting to determine the proximity of the two locations. If the distance between the reference and the employer is within a certain proximity, the system will determine this factor as a softlink. In other words, while the actual reference is hard linked to the candidate, there is a softlink to the employer because it is not known whether the employer knows the reference. Again, the system may also utilize an application programming interface (API), such as Google maps, to determine the travel distance and/or travel time between the two locations. Then, if the travel distance or travel time is within a certain range, the system will determine this factor as a softlink. The proximity data of the reference is preferably included along with the reference, to the employer for the job posting. As an example, if the system determines a candidate should be referred in response to a job posting, the system may send an SMS to the employer for the job posting, as follows:

9742282145, John Pavan, 3 yrs, marketing, Jayanagar
Candidate is referred by Joseph Miller, the owner of Amrutha enterprises, which is located across the street from your business.

The close proximity of the reference to the employer is useful to the prospective employer for the job posting because the employer may know the reference, or can easily make a personal visit to the reference to obtain a personal reference regarding the candidate.

4. Softlink Based on Identification of Potential Reference by Linking Personal Reference Data of the Personal and the Candidate Data, and/or Linking Personal Reference Data and Employer Data The system searches for connections that can be used to infer that a person may be a potential reference for a candidate for an employer of a job posting by comparing personal reference data within the candidate database, the job posting database and/or a personal reference database of the system. The personal reference database may include personal reference data regarding hardlink connections between an individual and other individuals, businesses, activities, organizations, social groups, and the like. As some examples, personal reference data for an individual may include information regarding the schools attended, children's schools, membership in organizations such as professional organizations, charitable organization, social organizations and clubs, familial relationships, the same or similar data as the candidate data described above, and the like. Step 108 of method 100 may include a softlink algorithm to that organizes and analyzes the data within the databases of the system to identify relationships between the personal reference data, candidate data and the employer data to identify one or more potential personal references for a candidate for an employer of a job posting. The softlink algorithm may utilize semantic matching among keywords and concepts within the databases to more effectively determine softlinks for potential personal references.

As an example of a personal reference softlink, consider that a candidate went to Harvard University and graduated in 1999. Also assume that the candidate has candidate qualifications that match the job criteria for a job posting for Company A. Within a personal reference database, there is personal reference data for an employee of Company A that indicates that the employee also attended Harvard University and graduated in 1999. The softlink algorithm can search for and map all of the connections between potential references and determine an inferred connection between the employee of Company A and the candidate. In this example, the softlink algorithm searches for employees, or even past employees, of Company A that attended the same school as the candidate and at the same time period as the candidate. The algorithm identifies the employee of Company A that attended Harvard University at the same time as the candidate, based on the assumption that the employee may know the candidate because they were at the same school at the same time, or that they may know each other because they have the same alma mater. While it is possible that the employee does not know anything about the candidate, the softlink still gives the candidate a potential for having a higher reliability than other candidates that do not have any softlinks, or have only softlinks with a lower softlink relevance index, as explained below. This is just one example, and it should be understood that the softlink algorithm is configured to search for many types of connections, not just school based connections.

At step 110, the employment recruiting system determines a softlink relevance index for the identified softlink. The softlink relevance index is a factor for a softlink that is related to a measure of the relevance or importance of a particular softlink. Softlinks will have varying degrees of relevance to making a candidate more reliable and/or desirable to an employer for a job posting. Thus, the softlink relevance index gives a different weight to various softlinks which is used to rank the candidates at step 112, as described below. For instance, a softlink for a first candidate based on the proximity of the first candidate's residence to the employer may be a stronger, more relevant hiring factor than a personal reference softlink for a second candidate based on a remote connection between a potential personal reference and the employer. In this case, the proximity based softlink will be weighted much greater than the personal reference softlink in ranking the candidates. Thus, if the first and second candidates are in all other respects equal (such as equal qualifications, etc.) for a job posting, the first candidate would be ranked higher than the second candidate. Not only may different types of softlinks have a different softlink relevance index, but softlinks of the same type may be determined to have a different softlink relevance index. For example, the softlink relevance index for proximity based softlinks may be related to the actual distance, such as a closer proximity has a higher index than a farther proximity. Or, a potential personal reference softlink having a closer relationship will have a higher index than a potential personal reference softlink that is remote, and less likely to result in a reliable reference for the employer.

The system may utilize a softlink relevance index algorithm to determine the softlink relevance index for a softlink. The softlink relevance index algorithm may be integrated with the softlink algorithm described above, or it may be separate.

The softlink algorithm and/or the softlink relevance index algorithm may utilize feedback of historical hiring decisions and other user interaction with the system to modify and optimize the algorithms. For instance, the system may be configured to support an employer to conduct telephonic interviews with candidates recommended by the system. The system can monitor the list of candidates to determine which candidates are called by the employers for interviews and the duration of such calls. One method of facilitating mobile telephone calls between candidates and employers, and monitoring the calls, is described in U.S. patent application Ser. No. 12/821,735, filed Jun. 23, 2010, the disclosure of which is incorporated by reference herein in its entirety. The system can also receive feedback from employers and/or candidates when a recommended candidate is hired. Candidates that are interviewed and/or hired are the candidates that the employers considered to be the most desirable, and the less desirable candidates are not interviewed or hired. The system uses this information to correlate the softlink information for the more desirable and less desirable candidates, and then adapts the softlink algorithm and/or softlink relevance index algorithm to determine and weight the softlinks more in line with the empirical data. As an example, if candidates with residences close to the employers are frequently being interviewed and hired, then the system may adapt the algorithm to increase the maximum proximity for indicating a softlink, and also increase the softlink relevance index for such proximity softlinks.

At step 112, the employment recruiting system generates a ranking of the candidates that are determined have candidate qualifications matching the job criteria for the job posting. In ranking the candidates, step 112 uses a candidate recommendation engine/algorithm to place the candidates in order from most desirable candidate to least desirable candidate (or vice versa). The candidate recommendation algorithm bases the ranking, at least in part, upon the softlink relevance index or indexes for each of the qualified candidates. A candidate can have more than one softlink, and thus, one more than one softlink relevance index, which is used by the candidate recommendation algorithm to rank the candidate. Typically, the candidate recommendation algorithm also assigns a candidate qualification index to each of the candidates related to the degree of qualifications of each respective candidate. The system may determine candidate qualification relevance indexes for each of the various qualification factors, based on the relative importance of each qualification factor. The system then combines each of the candidate qualification relevance indexes into an overall candidate qualification index. The candidate recommendation algorithm may also factor in other factors such as salary, career goals, relocation, hard link personal references, etc. The candidate recommendation algorithm then combines the qualification index and the softlink relevance index(es) for each candidate to rank the candidates from highest to lowest.

At step 114, the employment recruiting system makes available to the employer a list of the ranked candidates for the job posting to the employer (or other contact specified by the job poster of the job posting, such as a recruiter or employment agency, all of which are considered the employer for purposes of step 114). The system may make the list available to the employer by any suitable means, such as a list accessible via system website on the internet, transmitting the list via email to the employer, or transmitting the list to a cellular communication device via a cellular phone network. The system may make available only a specified number of the top ranked candidates at a time, so that the employer is not overwhelmed by a long list which may include marginally desirable candidates. For instance, the system first sends a specified number of the top ranked candidates. The number of candidates in a transmitted list may be a default number determined by the system, a number specified by the employer, or a number set in another suitable manner. For example, if the system is configured to send the list to a mobile phone of the employer, then a smaller number of candidates may be preferable. If the list is being sent via email, the list may be much longer.

Just as the system may receive candidate data and job posting data via a cellular phone network from a communication device such as a cellular phone or smart phone, the system may send candidate recommendations to employers, and job posting recommendations to candidates via a cellular phone network to the employers and candidates, respectively. The candidate recommendations and job posting recommendations may be sent using SMS messaging, MMS messaging, or an application program running on the cellular communication device. Accordingly, candidates and employers may utilize the employment recruiting system using only a cellular communication device, such as a cellular phone or smart phone. Of course, as described herein, candidates and/or employers may also utilize an internet connected computer to access and use the employment recruiting system.

Figure 2:
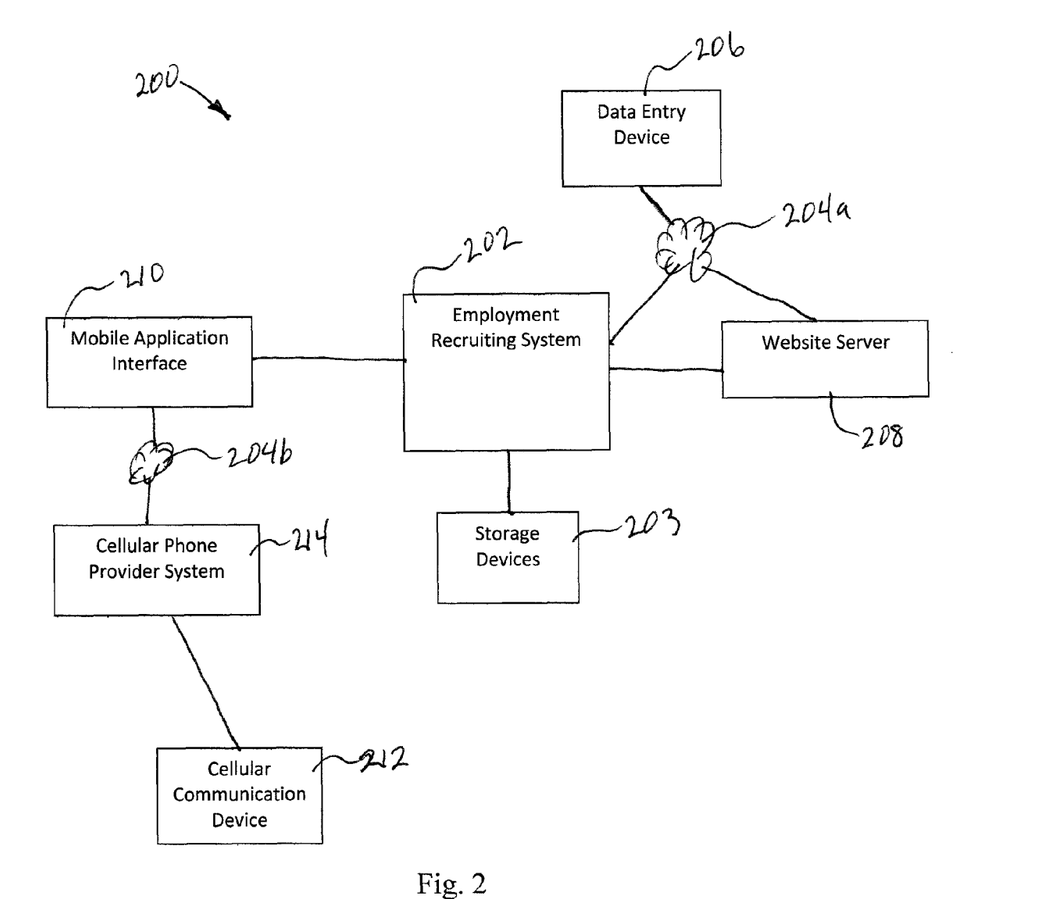
FIG. 2 illustrates an exemplary system for a system for performing computerized employment recruiting according to another embodiment of the present invention.

Turning now to FIG. 2, a non-limiting example of a system 200 is depicted that may be used to implement any of the methods for employment recruiting, including method 100 described above and any other method embodiments described herein. The system 200 comprises an employment recruiting system 202 which includes one or more computers, servers, and storage devices 203. The computer(s) host an employment recruiting software program. The software application is configured to perform the steps of the method, such as accessing and/or storing a candidate database and a job posting database, comparing qualifications of candidates to job criteria for job postings, determining a match between the qualifications of candidates and the job criteria for job postings, identifying softlinks, determining softlink relevance indexes, generating a ranking of candidates based upon the softlink relevance indexes, and making the ranking of candidates available to the employer for the job posting.

The storage devices 203 store the candidate database and the job posting database. The employment recruiting system 202 may access the candidate database and job posting database through a communication network 204a.

The communication network 204a provides communication with a data entry device 206, such as an internet connected computer, or internet enabled device, or a cellular communication device such as a mobile phone or smart phone. The system 200 may further comprise a website server 208 which may comprise one or more computers, servers and peripherals in operable communication with each other in which at least one of the servers is connected to the internet, such as through the communication network 204a. The website server 208 includes pages, files and software programming, such as a system software application, for interacting with a candidate's or employer' web enabled data entry device 206. The web enabled device 206 may be a computer (such as a personal computer), a handheld web-enabled device, a PDA (personal digital assistant), a mobile phone, or other electronic device having a display which can receive electronic data and display a graphic represented by the electronic data. The website server 208 may display an application form and other information to allow a candidate or employer to use the employment recruiting system 202.

The system 200 may also comprise a mobile application interface 210 configured to communicate with a data entry device that is a cellular communication device 212 such as a mobile phone or smart phone. The mobile application interface 210 is in operable communication with a cellular phone provider system 214 through a communication network 204b. The mobile application interface 210 provides communication of information between the employment recruiting system 202 and the mobile cellular device 212. As described above, the system 200 can then facilitate the use of the system 202 using messaging services, like SMS and MMS, or an app running on the mobile cellular device 212.

Each of the communication networks 204a-b may include a proprietary network, LAN, WAN, cellular network, wireless network, the internet and/or other suitable network, or a any combination of thereof.

Accordingly, a system 200 is provided which can provide and implement the methods for computerized employment recruiting according to the method 100, and any other methods described herein.

The method 100, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the methods 100, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A method for computerized employment recruiting, comprising the steps of:
   accessing, by a computerized employment recruiting system, a candidate database of candidate data for a plurality of candidates, including a first candidate, said candidate data for each candidate including candidate qualifications and candidate personal information;
   accessing, by the computerized employment recruiting system, a job posting database including job posting data for a plurality of job postings, the job posting data for each job posting including employer information and job criteria;
   comparing, by said employment recruiting system, said candidate qualifications of said first candidate to said job criteria for a plurality of said job postings;
   determining, by said employment recruiting system, a match between said candidate qualifications of said first candidate and job criteria for a first job posting within said plurality of job postings;
   identifying, by said employment recruiting system, a softlink between said first candidate and said first job posting by matching candidate information with saved business information regarding the employer of the first job posting using a softlink algorithm;
   determining a softlink relevance index for said softlink;
   generating, by said employment recruiting system, a ranking of said first candidate among a plurality of candidates for said first job posting based, at least in part, upon said softlink relevance index.

2. The method of claim 1, wherein said step of determining a match between the candidate qualifications of said first candidate and the job criteria for said first job posting within said plurality of job postings utilizes a candidate matching algorithm which includes semantic matching of terms within said candidate qualifications and terms within said first job posting.

3. The method of claim 2, wherein said candidate matching algorithm further uses an ontology based classification of said job posting database.

4. The method of claim 3, wherein said method further comprises the steps of:
   assigning a candidate qualification relevancy index to at least one of said candidate qualifications for said first candidate;
   determining an overall candidate qualification index for said first candidate based upon said candidate qualification relevancy index; and
   wherein said step of generating a ranking of said first candidate among a plurality of candidates is based, at least in part, upon the candidate qualification index for said first candidate.

5. The method of claim 1, wherein said softlink is a proximity based softlink.

6. The method of claim 1, wherein said softlink is a potential personal reference softlink.

7. The method of claim 1, further comprising the step of:
making available to an employer for said first job posting a list of said ranking of the first candidate among a plurality of candidates.

8. The method of claim 7, wherein said list is made available to said employer by transmitting the list of candidates via a cellular phone network to a cellular communication device of said employer.

9. A system for computerized employment recruiting, comprising:
an employment recruiting system comprising at least one computer and at least one employment recruiting software program, the employment recruiting system operably coupled to a communication network for providing communication between a data entry device of an employer posting a job posting and said employment recruiting system, the employment recruiting system configured to perform the following steps:
accessing a candidate database of candidate data for a plurality of candidates, including a first candidate, said candidate data for each candidate including candidate qualifications and candidate personal information;
accessing a job posting database including job posting data for a plurality of job postings, the job posting data for each job posting including employer information and job criteria;
comparing said candidate qualifications of said first candidate to said job criteria for a plurality of said job postings;
determining a match between said candidate qualifications of said first candidate and job criteria for a first job posting within said plurality of job postings;
identifying a softlink between said first candidate and said first job posting by matching candidate information with saved business information regarding the employer of the first job posting using a softlink algorithm;
determining a softlink relevance index for said softlink;
generating a ranking of said first candidate among a plurality of candidates for said first job posting based, at least in part, upon said softlink relevance index.

10. The system of claim 9, wherein said employment recruiting software program includes a candidate matching algorithm which includes semantic matching of terms within said candidate qualifications and terms within said first, job posting, and said step of determining a match between the candidate qualifications of said first candidate and the job criteria for said first job posting within said plurality of job postings utilizes said candidate matching algorithm.

11. The system of claim 10, wherein said candidate matching algorithm further uses an ontology based classification of said job posting database.

12. The system of claim 11, wherein said employment recruiting system is further configured to perforin the steps of:
assigning a candidate qualification relevancy index to at least one of said candidate qualifications for said first candidate;
determining an overall candidate qualification index for said first candidate based upon said candidate qualification relevancy index; and
wherein said step of generating a ranking of said first candidate among a plurality of candidates is based, at least in part, upon the candidate qualification index for said first candidate.

13. The system of claim 9, wherein said softlink is a proximity based softlink.

14. The system of claim 9, wherein said softlink is a potential personal reference based softlink.

15. The system of claim 1, wherein said employment recruiting system is further configured to perform the steps of:
making available to an employer for said first job posting a list of said ranking of the first candidate among a plurality of candidates.

16. The system of claim 15, wherein said list is made available to said employer by transmitting the list of candidates via a cellular phone network to a cellular communication device of said employer.

17. The system of claim 9, wherein said data entry device is a cellular communication device.

18. An article of manufacture comprising a computer program carrier readable by a computer and embodying one or more instructions executable by the computer to perform method steps for employment recruiting, the method steps comprising:
accessing a candidate database of candidate data for a plurality of candidates, including a first candidate, said candidate data for each candidate including candidate qualifications and candidate personal information;
accessing a job posting database including job posting data for a plurality of job postings, the job posting data for each job posting including employer information and job criteria;
comparing said candidate qualifications of said first candidate to said job criteria for a plurality of said job postings;
determining a match between said candidate qualifications of said first candidate and the job criteria for a first job posting within said plurality of job postings;
identifying a softlink between said first candidate and said first job posting by matching candidate information with saved business information regarding the employer of the first job posting using a softlink algorithm;
determining a softlink relevance index for said softlink;
generating a ranking of said first candidate among a plurality of candidates for said first job posting based, at least in part, upon said softlink relevance index.

19. The article of manufacture of claim 18, wherein said instructions executable by the computer includes a candidate matching algorithm which includes semantic matching of terms within said candidate qualifications and terms within said first job posting, and said step of determining a match between the candidate qualifications of said first candidate and the job criteria for said first job posting within said plurality of job postings utilizes said candidate matching algorithm.

20. The article of manufacture of claim 19, wherein said candidate matching algorithm further uses an ontology based classification of said job posting database.

21. A method for computerized employment recruiting, comprising the steps of:
accessing, by a computerized employment recruiting system, a candidate database of candidate data for a plurality of candidates, including a first candidate, said candidate data for each candidate including candidate qualifications and candidate personal information;

accessing, by the computerized employment recruiting system, a job posting database including job posting data for a plurality of job postings, the job posting data for each job posting including employer information and job criteria;

comparing, by said employment recruiting system, said candidate qualifications of said first candidate to said job criteria for a plurality of said job postings;

determining, by said employment recruiting system, a match between said candidate qualifications of said first candidate and job criteria for a first job posting within said plurality of job postings;

identifying, by said employment recruiting system, a softlink between said first candidate and said first job posting, by using a softlink algorithm to identify a person who is a potential personal reference for the candidate for the employer of the first job posting, wherein the potential personal reference has a connection between both the candidate and the employer;

determining a softlink relevance index for said softlink;

generating, by said employment recruiting system, a ranking of said first candidate among a plurality of candidates for said first job posting based, at least in part, upon said softlink relevance index.

* * * * *